US012151537B2

(12) United States Patent
Kim et al.

(10) Patent No.: US 12,151,537 B2
(45) Date of Patent: Nov. 26, 2024

(54) THERMAL MANAGEMENT SYSTEM CONTROL METHOD FOR VEHICLE

(71) Applicants: HYUNDAI MOTOR COMPANY, Seoul (KR); KIA CORPORATION, Seoul (KR)

(72) Inventors: Jae Yeon Kim, Hwaseong-si (KR); Su Whan Kim, Hwaseong-si (KR); Jeawan Kim, Gwangmyeong-si (KR); SeungRyeol Lee, Hwaseong-si (KR); Yeonho Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 485 days.

(21) Appl. No.: 17/544,248

(22) Filed: Dec. 7, 2021

(65) Prior Publication Data
US 2023/0001766 A1 Jan. 5, 2023

(30) Foreign Application Priority Data

Jul. 1, 2021 (KR) .................... 10-2021-0086227

(51) Int. Cl.
*B60H 1/00* (2006.01)
*B60H 1/32* (2006.01)
*B60L 58/26* (2019.01)

(52) U.S. Cl.
CPC ..... *B60H 1/00885* (2013.01); *B60H 1/00278* (2013.01); *B60H 1/3205* (2013.01); *B60L 58/26* (2019.02); *B60H 2001/00307* (2013.01); *B60H 2001/3266* (2013.01); *Y02T 10/70* (2013.01)

(58) Field of Classification Search
CPC ............ B60H 1/00278; B60H 1/00885; B60H 1/3205; B60H 2001/00307; B60H 2001/3266; B60L 58/26; Y02T 10/70
See application file for complete search history.

(56) References Cited

U.S. PATENT DOCUMENTS

| 4,957,274 A * | 9/1990 | Hood .................. F16K 37/0041 |
| | | 251/129.05 |
| 2013/0079963 A1* | 3/2013 | Shono ....................... H02K 9/19 |
| | | 165/200 |
| 2014/0250929 A1* | 9/2014 | Takahashi ............... F25B 41/24 |
| | | 62/115 |
| 2014/0331693 A1* | 11/2014 | Meitinger .............. B60K 11/02 |
| | | 62/190 |

(Continued)

*Primary Examiner* — Dale Moyer
(74) *Attorney, Agent, or Firm* — MCDONNELL BOEHNEN HULBERT & BERGHOFF LLP

(57) ABSTRACT

A thermal management system control method for a vehicle is disclosed. An embodiment of the present disclosure provides a thermal management system control method for a vehicle, including: (A) a process in which a controller determines whether a track driving mode is selected based on data detected from a data detector before track driving of the vehicle, and determines an alignment position of a valve; (B) a process in which the controller, through the process (A), determines the alignment position of the valve to control a water pump or an oil pump, and operates an air conditioner; and (C) a process in which, when the air conditioner is operated through the process (B), the controller controls a battery chiller expansion valve and a compressor, and ends the control.

13 Claims, 3 Drawing Sheets

(56) References Cited

U.S. PATENT DOCUMENTS

| | | | |
|---|---|---|---|
| 2015/0217623 A1* | 8/2015 | Hatakeyama | B60L 1/02 |
| | | | 429/62 |
| 2018/0117986 A1* | 5/2018 | Kim | H01M 10/625 |
| 2018/0215234 A1* | 8/2018 | Lott | F02B 29/0493 |
| 2020/0215871 A1* | 7/2020 | Tomita | B60H 1/26 |
| 2022/0089061 A1* | 3/2022 | Farley | B60W 30/182 |

* cited by examiner

THERMAL MANAGEMENT SYSTEM CONTROL METHOD FOR VEHICLE

CROSS-REFERENCE TO RELATED APPLICATION

This application claims priority to and the benefit of Korean Patent Application No. 10-2021-0086227 filed in the Korean Intellectual Property Office on Jul. 1, 2021, the entire contents of which are incorporated herein by reference.

BACKGROUND

(a) Field

The present disclosure relates to a thermal management system control method for a vehicle, and more particularly, to a thermal management system control method for a vehicle that may prevent a rapid temperature rise of an electrical component and a battery module during track driving of a high performance electric vehicle.

(b) Description of the Related Art

In recent years, an electric vehicle has become popular as a future transporting means, as the environment and energy resources are becoming important issues. The electric vehicle uses a battery module in which a plurality of rechargeable cells are formed as one pack as a main power source, and thus no exhaust gas is generated and noise is very low.

Such an electric vehicle is driven by a driving motor which operates through electric power supplied from the battery module. In addition, the electric vehicle includes electrical components for controlling and managing the driving motor as well as a plurality of electronic convenience devices and charging the battery module.

Since a large amount of heat is generated in the battery module as well as the electrical components including the driving motor used as a primary power source of the electric vehicle, efficient cooling is required, so efficient temperature management of the electrical components and the battery module may be a very important problem.

Conventionally, separate cooling systems are applied to adjust the temperature of the electrical components and the battery module, but it is necessary to increase capacity of the cooling system according thereto, which leads to space restrictions. Further, when the capacity of the cooling systems is increased, power required for operating the cooling systems is also increased.

Accordingly, technologies are being developed for efficiently using waste heat generated from the electrical components, as well as adjusting the temperature of the electrical components and the battery in order to maximize the energy efficiency while securing the durability of the electrical components and the battery module in the electric vehicle.

On the other hand, recently, high-performance electric vehicles capable of track driving are being developed, and in the track driving that requires higher performance compared with general driving and in which a lot of load is generated, temperature changes of electrical components and battery modules may rapidly occur.

Accordingly, in the electric vehicle capable of track driving, there is a demand for technology development for controlling the temperature of the electrical components and the battery modules during the track driving and for optimizing the track driving.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a thermal management system control method for a vehicle that may prevent a rapid temperature rise of an electrical component and a battery module during track driving of a high performance electric vehicle.

An embodiment of the present disclosure provides a thermal management system control method for a vehicle, including: (A) a process in which a controller determines whether a track driving mode is selected based on data detected from a data detector before track driving of the vehicle, and determines an alignment position of a valve; (B) a process in which the controller, through the process (A), determines the alignment position of the valve to control a water pump or an oil pump, and operates an air conditioner; and (C) a process in which when the air conditioner is operated through the process (B), the controller controls a battery chiller expansion valve and a compressor, and ends the control.

The process (A) may include operating, by the controller, the track driving mode according to an operation of a track driving mode operating part by a manipulation or setting of a user before driving of the vehicle, and determining, by the controller, whether an operating position of the valve is aligned based on the data detected from the data detector.

In the determining, by the controller, of whether the operating position of the valve is aligned, when it is determined that the operating position of the valve is aligned (that is, when a condition is satisfied), the process (B) may be performed.

The process (B) may include: operating, by the controller, a water pump or an oil pump; and operating, by the controller, the air conditioner.

In the operating, by the controller, of the water pump or the oil pump, the controller may control an operation amount of the water pump or the oil pump according to a temperature of an electrical component based on the data detected by the data detector.

In the determining, by the controller, of whether the operating position of the valve is aligned, when it is determined that the operating position of the valve is not aligned (that is, when a condition is not satisfied), the controller may perform aligning of the operating position of the valve.

After the controller performs the aligning of the operating position of the valve, the controller may perform operating of a water pump or an oil pump.

The process (A) may include increasing, by the controller, a de-rating temperature of a battery module.

The increasing of the de-rating temperature of the battery module may be performed after the operating of the track driving mode.

The process (C) may include operating, by the controller, a battery chiller expansion valve, and controlling, by the controller, the compressor, and terminating the control.

The process (C) may include adjusting, by the controller, an opening degree of the battery chiller expansion valve.

The adjusting, by the controller, of the opening degree of the battery chiller expansion valve may be performed based on data detected from the data detector after the operating, by the controller, of the battery chiller expansion valve.

In the controlling, by the controller, of the compressor, the controller may increase revolutions per minute (RPM) of the compressor.

The data detector may include a track driving mode operating part that operates according to a manipulation of a user, a battery temperature sensor that measures a temperature of a battery module, an electrical component temperature sensor that measures a temperature of an electrical component, and a valve detector that detects an alignment position of the valve.

According to the thermal management system control method for the vehicle according to the embodiment of the present disclosure as described above, it is possible to improve overall cooling performance by preventing a rapid temperature rise of an electrical component and a battery module during track driving of a high performance electric vehicle.

In addition, according to the present disclosure, it is possible to secure additional cooling performance during track driving of a vehicle by performing temperature control of an electrical component and a battery module before a start of the track driving.

In addition, according to the embodiment of the embodiment of the present disclosure, it is possible to operate a battery module at optimal performance by efficiently controlling a temperature of the battery module, and it it possible to increase a total mileage of a vehicle through efficient management of the battery module.

Further, according to the embodiment of the present disclosure, it is possible to improve durability and reliability of an electrical component and a battery module through efficient temperature control of the electrical component and the battery module, and it is possible to reduce maintenance costs, thereby improving overall marketability of a vehicle.

DETAILED DESCRIPTION

Figure 1:
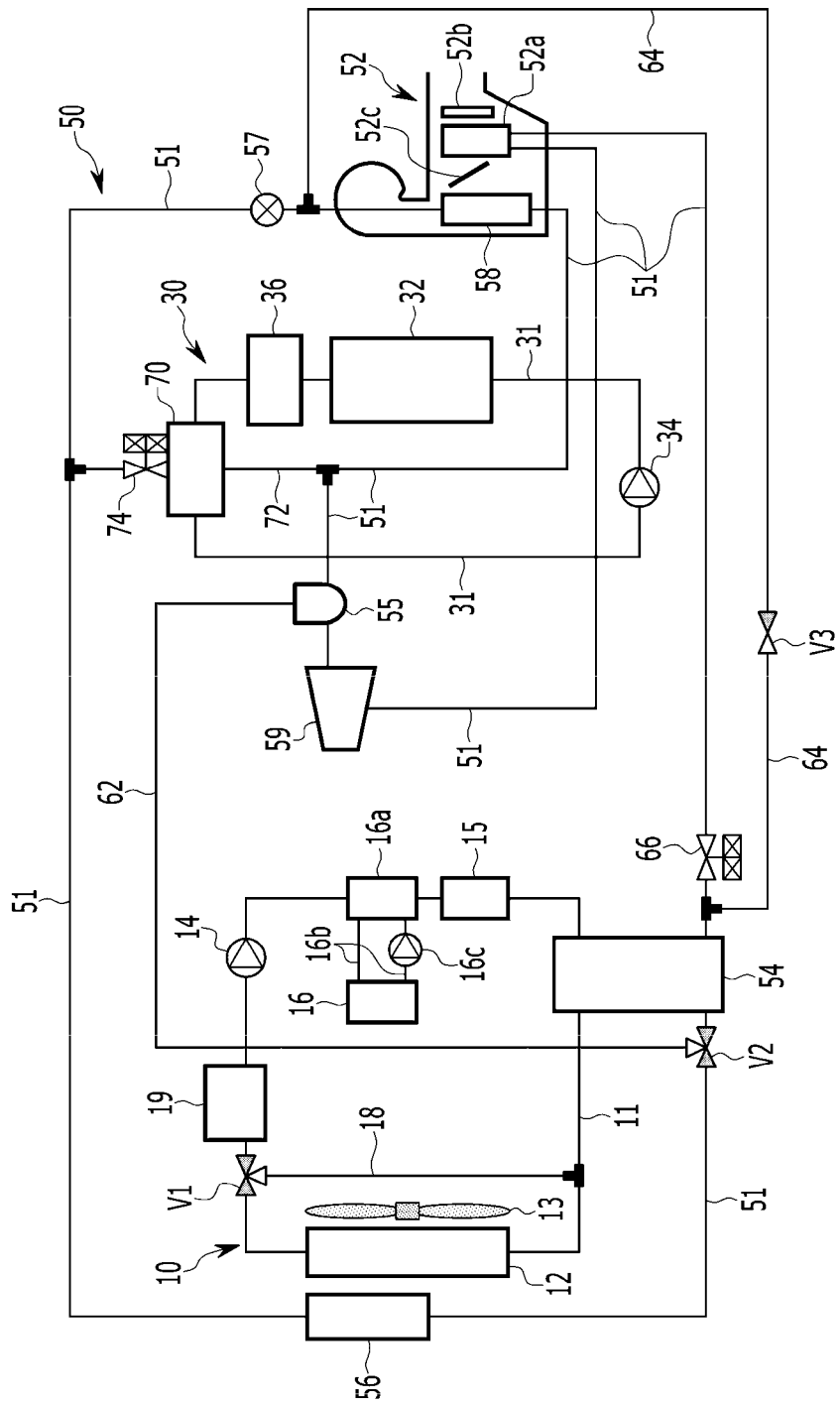
FIG. 1 illustrates a block diagram of a thermal management system to which a thermal management system control method for a vehicle according to an embodiment of the present disclosure is applied.

An embodiment of the present disclosure will hereinafter be described in detail with reference to the accompanying drawings.

Since the embodiment described in the specification and the configurations shown in the drawings are merely the most preferable embodiment and configurations of the present disclosure, they do not represent all of the technical ideas of the present disclosure, and it should be understood that that various equivalents and modified examples, which may replace the embodiments, are possible when filing the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
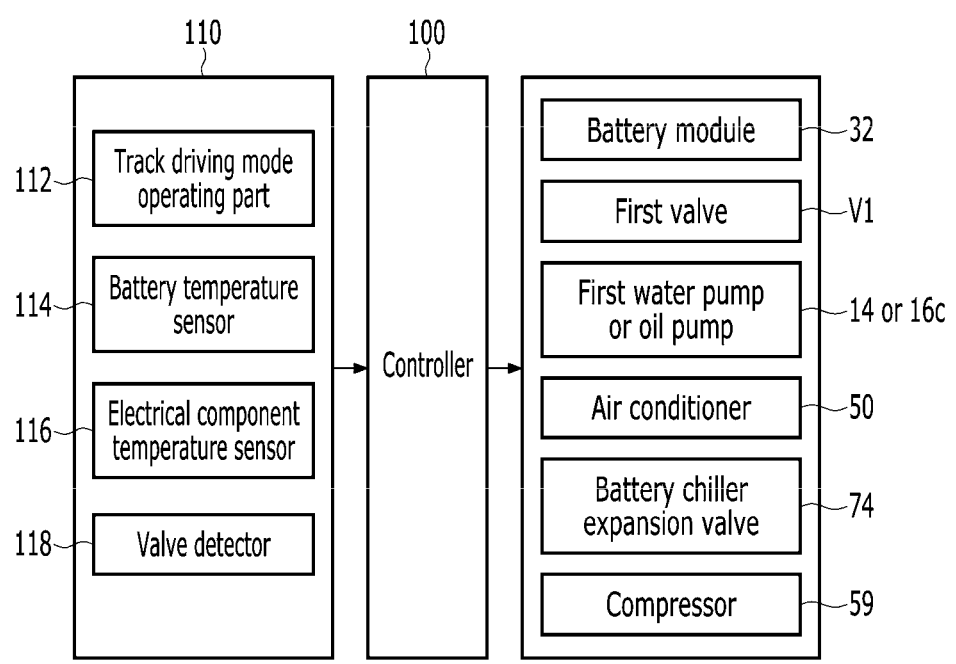
FIG. 2 illustrates a block diagram of a thermal management system control apparatus to which a thermal management system control method for a vehicle according to an embodiment of the present disclosure is applied.

FIG. 1 illustrates a block diagram of a thermal management system to which a thermal management system control method for a vehicle according to an embodiment of the present disclosure is applied, and FIG. 2 is a block diagram of a thermal management system control apparatus to which a thermal management system control method for a vehicle according to an embodiment of the present disclosure is applied.

Referring to FIG. 1, a thermal management system control method according to an embodiment of the present disclosure is controlled by a controller 100, and it is applied to a thermal management system to prevent a rapid temperature rise of an electrical component 15, a motor 16, and a battery module 32 during track driving of a high performance electric vehicle.

Here, the thermal management system includes a cooling apparatus 10, a battery cooling apparatus 30, an air conditioner 50, and a battery chiller 70, as shown in FIG. 1.

First, the cooling apparatus 10 includes a radiator 12 connected to a coolant line 11 and a first water pump 14. The cooling apparatus 10 circulates a coolant in the first coolant line 11 through an operation of the first water pump 14 to cool an electrical component 15 and a motor 16.

The first radiator 12 is disposed at the front of the vehicle, and a cooling fan 13 is provided at the rear thereof, so that the coolant is cooled through an operation of the cooling fan 13 and heat-exchange with the outside air.

Here, the electrical component 15 may include a power control apparatus, an inverter, a power converter such as an on board charger (OBC), and an autonomous driving controller.

The power control apparatus or the inverter may heat up while driving, and the on board charger may heat up when charging the battery module 32.

The electrical component 15 configured as described above may be provided in the coolant line 11 to be cooled in a water-cooled manner.

That is, when the waste heat of the electrical component 15 is recovered in the heating mode of the vehicle, the heat generated from the power conversion apparatus such as the power control apparatus, the inverter, or the OBC may be recovered.

Meanwhile, the cooling apparatus 10 circulates a coolant in the coolant line 11 through an operation of the first water pump 14 to cool an oil cooler 16a that cools the electrical component 15 and the motor 16.

Here, the motor 16 is connected to the oil cooler 16a provided in the coolant line 11 through an oil line 16b, and an oil pump 16c may be provided in the oil line 16b.

That is, the oil cooler 16a may cool oil supplied to the motor 16 by using a coolant supplied from the radiator 12.

The oil pump 16c may be selectively operated to supply the cooled oil to the motor 16 when cooling of the motor 16 is required.

In addition, the oil pump 16c may be operated when recovering the waste heat generated by the motor 16 in the heating mode of the vehicle.

That is, while the oil cooled by the oil cooler 16a cools the motor 16 through the oil line 16b, a temperature thereof is increased. The oil with an increased may increase the temperature of the coolant as it is cooled through heat-exchange with the coolant in the oil cooler 16a.

The waste heat generated from the motor 16 may be recovered through the operation as described above.

Meanwhile, a reservoir tank 19 is provided in the coolant line 11 between the radiator 12 and the first water pump 14. The coolant cooled by the first radiator 12 may be stored in the reservoir tank 19.

The cooling apparatus 10 configured as described above circulates a coolant in the coolant line 11 so that the coolant is supplied to the oil cooler 16a for cooling the electrical component 15 and the motor 16.

That is, the cooling apparatus 10 circulates the coolant cooled by the radiator 12 along the coolant line 11 through the operation of the first water pump 14, thereby cooling the electrical component 15 and the oil cooler 16a so as to not overheat.

Although the present embodiment is described with one motor 16, the present disclosure is not limited thereto, and there may two motors 16 to correspond to a front wheel and a rear wheel.

When there are two motors 16, they may be disposed in parallel through a separate parallel line in the coolant line 11.

Meanwhile, a branch line 18 connected to the coolant line 11 between the radiator 12 and the first water pump 14 through the first valve V1 provided in the coolant line 11 between the radiator 12 and the first water pump 14, may be provided in the cooling apparatus 10.

One end of the branch line 18 may be connected to the coolant line 11 through the first valve V1, and the other end of the branch line 18 may be connected to the coolant line 11 between the radiator 12 and the first water pump 18.

The branch line 18 is selectively opened through the operation of the first valve V1 when the coolant temperature is raised by absorbing the waste heat generated from the electrical component 15 and the motor 16. In this case, the coolant line 11 connected to the radiator 12 is closed through the operation of the first valve V1.

In the present embodiment, the battery cooling apparatus 30 may include a battery module 32 and a second water pump 34 connected through a battery coolant line 31.

The battery module 32 supplies power to the electrical component 15 and the motor 16, and is cooled with a coolant flowing along the battery coolant line 31.

The battery module 32 may circulate the coolant therein through the operation of the second water pump 34 provided in the battery coolant line 31.

Here, the first and second water pumps 14 and 34 may be electric water pumps.

In the present embodiment, the air conditioner 50 includes an HVAC (heating, ventilation, and air conditioning) module 52, a main heat exchanger 54, an accumulator 55, an evaporator expansion valve 57, an evaporator 58, and a compressor 59, which are connected thereto through a refrigerant line 51.

First, the HVAC module 52 includes an opening/closing door 52c that is connected thereto through the refrigerant line 51, and controls the external air passing through the evaporator 58 to selectively flow into an internal condenser 52a and an internal heater 52b according to the cooling, heating, and heating/dehumidifying modes of the vehicle.

That is, the opening/closing door 52c is opened so that the external air that has passed through the evaporator 58 flows into the internal condenser 52a and the internal heater 52b in the heating mode of the vehicle. In contrast, in the cooling mode of the vehicle, the opening/closing door 52c closes the internal condenser 52a side and the internal heater 52b side so that the external air cooled while passing through the evaporator 58 directly flows into the vehicle.

The main heat exchanger 54 is connected to the coolant line 51 so that the coolant passes through it, and is connected to the coolant line 11 so that the coolant circulating in the cooling apparatus 10 passes through it.

The main heat exchanger 54 may condense or evaporate the refrigerant through the heat-exchange with the coolant supplied through the coolant line 11 according to the vehicle mode. That is, the main heat exchanger 54 may be a water-cooled heat exchanger into which a coolant flows.

The main heat exchanger 54 configured as described above heat-exchanges the refrigerant supplied from the compressor 59 through the internal condenser 52a with the coolant supplied from the cooling apparatus 10. Through this operation, the main heat exchanger 54 may lower a temperature of the refrigerant, and may increase an amount of condensation or evaporation.

In the present embodiment, the accumulator 55 is selectively supplied with the refrigerant discharged from the main heat exchanger 54 through a second valve V2 that operates according to the vehicle mode.

The accumulator 55 improves efficiency and durability of the compressor 39 by supplying only the gaseous refrigerant to the compressor 39.

On the other hand, the refrigerant line 51 between the main heat exchanger 54 and the evaporator 58 may be provided with a sub-condenser 56 for additionally condensing the refrigerant that has passed through the main heat exchanger 54.

The refrigerant that has passed through the main heat exchanger 54 may selectively flow into the sub-condenser 56 according to the operation of the second valve V2.

That is, the sub-condenser 56 is disposed in front of the radiator 12 to mutually heat-exchange the refrigerant flowing thereinto with the outside air.

As such, when the main heat exchanger 54 condenses the refrigerant, the sub-condenser 56 further condenses the refrigerant condensed in the main heat exchanger 54, so that it may increase sub-cooling of the refrigerant, thus a coefficient of performance (COP), which is a coefficient of cooling capacity to required power of a compressor, may be improved.

In the present embodiment, the evaporator expansion valve 57 is provided in the refrigerant line 51 connecting the sub-condenser 56 and the evaporator 58. The evaporator expansion valve 57 receives the refrigerant passed through the sub-condenser 56 to expand it. The evaporator expansion valve 57 may be an electronic or mechanical expansion valve.

The compressor 59 is connected between the evaporator 58 and the main heat exchanger 54 through the refrigerant line 51. The compressor 59 may compress the gaseous refrigerant, and may supply the compressed refrigerant to the internal condenser 52a.

The air conditioner 50 configured as described above may further include a battery chiller expansion valve 74, a first bypass line 62, a heat exchanger expansion valve 66, and a second bypass line 64.

First, the battery chiller expansion valve 74 is provided in a refrigerant connection line 72 between the sub-condenser 56 and the battery chiller 70.

Here, the battery chiller expansion valve 74 is operated when cooling the battery module 30 by using a refrigerant. The battery chiller expansion valve 74 may expand the refrigerant flowing through the refrigerant connection line 72 to flow into the battery chiller 70.

That is, the battery chiller expansion valve 74 expands the refrigerant condensed in and discharged from the sub-condenser 56 to flow it into the battery chiller 70 in a state of lowering the temperature thereof, so that the temperature of the coolant passing through the inside of the battery chiller 70 may be further reduced.

Accordingly, the coolant whose temperature is reduced while passing through the battery chiller 70 may flow into the battery module 32 to be more efficiently cooled.

In the present embodiment, the first bypass line 62 may connect the main heat exchanger 54 and the accumulator 55 through the second valve V2 so that the refrigerant that has passed through the main heat exchanger 54 may be selectively flowed into the compressor 59 through the accumulator 55.

That is, the second valve V2 may selectively open the first bypass line 62 according to the vehicle mode.

Here, the accumulator 55 may supply a gaseous refrigerant of the refrigerant supplied through the first bypass line 62 opened through the operation of the second valve V2 to the compressor 59.

In the present embodiment, the heat exchanger expansion valve 66 may be provided in the refrigerant line 51 between the internal condenser 52a and the main heat exchanger 54.

The heat-exchanger expansion valve 66 may selectively expand the refrigerant flowing into the main heat exchanger 54 and the second bypass line 64 in the vehicle's heating and dehumidifying modes.

In addition, the second bypass line 64, so that some of the refrigerant that has passed through the internal condenser 52a may selectively flow into the evaporator 58, may connect the refrigerant line 51 between the main heat exchanger 54 and the heat exchanger expansion valve 66 to the refrigerant line 51 between the evaporator expansion valve 57 and the evaporator 58.

Here, the second bypass line 64 may be provided with a third valve V3. The third valve V3 may selectively open the second bypass line 64 according to the vehicle mode.

That is, the battery chiller expansion valve 74 and the heat exchanger expansion valve 66 may be electronic expansion valves that selectively expand a refrigerant while controlling flow of the refrigerant.

In addition, the first and second valves V1 and V2 may be 3-way valves that may distribute a flow rate, and the third valve V3 may be a 2-way valve.

In addition, the battery chiller 70 is provided in the battery coolant line 31 so that the coolant passes therein, and it is connected to the coolant line 51 through the coolant connection line 72.

The battery chiller 70 may heat-exchange the coolant selectively introduced therein with the coolant supplied from the air conditioner 50 to control the temperature of the coolant. Here, the battery chiller 70 may be a water-cooled heat exchanger into which a coolant flows.

A heater 36 may be provided in the battery coolant line 31 between the battery module 32 and the battery chiller 70.

The heater 36 is turned on when the temperature of the battery module 32 is required to increase and heats the coolant circulated in the battery coolant line 31, thereby flowing the coolant of the increased temperature to the battery module 32.

The heater 36 may be an electric heater that operates according to supplying of power.

The thermal management system configured as described above may be controlled by a thermal management system control apparatus as shown in FIG. 2, and the thermal management system control apparatus may include the controller 100 and a data detector 110.

Here, the data detector 110 may detect whether a track driving mode of a vehicle is selected in the thermal management system, a temperature of the battery module 32, a temperature of the electrical component 15, and data on an operation of the first valve V1.

The data detected by the data detector 110 is transmitted to the controller 100. The data detector 110 may include a track driving mode operating part 112, a battery temperature sensor 114, an electrical component temperature sensor 116, and a valve detector 118.

First, the track driving mode operating part 112 may be operated by a manipulation or setting of a user before track driving. When the track driving mode operating part 112 is operated by the user, a signal corresponding thereto is transmitted to the controller 100.

Here, the track driving mode operating part 112 may be applied as a switch or button structure provided inside the vehicle, or may be applied as an icon on a touch screen.

The battery temperature sensor 114 measures the temperature of the battery module 32 to transmit a signal corresponding thereto to the controller 100.

The electrical component temperature sensor 116 measures temperatures of the electrical component 15 and the motor 16 to transmit signals corresponding thereto to the controller 100.

In addition, the valve detector 118 transmits a signal on the operation of the first valve V1 to the controller 100.

The controller 100, in order to prevent the rapid temperature rise of the electrical component 15 and the battery module 32 during the track driving of the electric vehicle based on the data detected by the data detector 110, controls the first water pump 14, the oil pump 16c, the air conditioner 50, the battery chiller expansion valve 74, or the compressor 59.

In addition, when the track driving mode operating part 112 is operated, the controller 100 may increase a de-rating temperature of the battery module 32 before the start of the track driving of the electric vehicle.

For this purpose, the controller 100 may be implemented as at least one processor operating according to a predetermined program, and the predetermined program may include a series of instructions for performing respective steps included in an air conditioning system control method according to an embodiment of the present disclosure to be described later.

Figure 3:
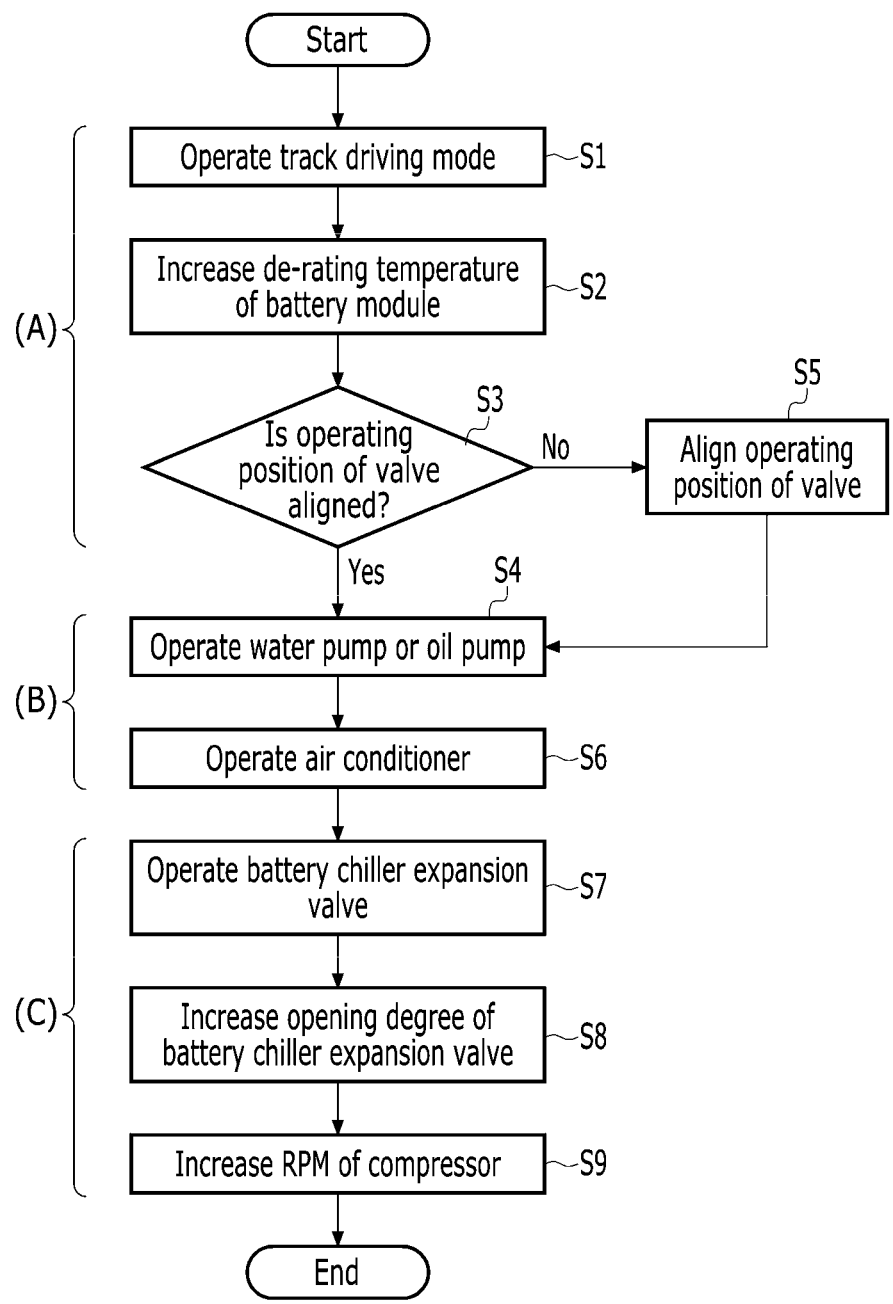
FIG. 3 illustrates a control flowchart of a thermal management system control method for a vehicle according to an embodiment of the present disclosure.

FIG. 3 illustrates a control flowchart of a thermal management system control method for a vehicle according to an embodiment of the present disclosure.

Referring to FIG. 3, a thermal management system control method for a vehicle according to an embodiment of the present disclosure includes (A) a process in which the controller 100 checks whether the track driving mode is selected based on the data detected by the data detector 110 before the track driving of the vehicle, and determines the alignment position of the first valve V1, (B) a process in which through the process (A), the controller 100 determines the alignment position of the first valve V1 to control the first water pump 14 or the oil pump 16c, and operates the air conditioner 50, and (C) a process in which when the air conditioner 50 is operated through the process (B), the controller 100 controls the battery chiller expansion valve 74 and the compressor 59 and ends the control.

In the present embodiment, the process (A) may include the following steps.

First, the controller 100 operates the track driving mode according to the operation of the track driving mode operating part 112 by the user's manipulation or setting before the vehicle's track driving at S1.

Then, the controller 100 increases the de-rating temperature of the battery module 32 at S2.

Here, the de-rating temperature of the battery module 32 means a speed limiting temperature of the vehicle according to a predetermined temperature of the battery module 32.

That is, the controller 100 increases the de-rating temperature of the battery module 32 when the track driving mode operating part 112 is operated, so that even if the temperature of the battery module 32 rises to be higher than or equal to a predetermined de-rating temperature during the track driving, it is possible to allow the speed of the vehicle to not be limited.

As described above, the increasing of the de-rating temperature of the battery module 32 at S2 may be performed after the operating of the track driving mode at S1.

In this state, the controller 100 determines whether the operating position of the first valve V1 is aligned based on the data detected from the data detector 110 at S3.

Here, the controller 100 may determine whether the first valve V1 closes the branch line 18 by the signal outputted from the valve detector 118 and whether the coolant line 11 connected to the radiator 12 is opened based on the first valve V1.

That is, when the operating position of the first valve V1 is aligned in the track driving mode, the branch line 18 is closed, and the coolant line 11 connected to the radiator 12 is opened based on the first valve V1.

In step S3 in which the controller 100 determines whether the operating position of the first valve V1 is aligned, when it is determined that the operating position of the first valve V1 is aligned (that is, when a condition is satisfied), the process (B) may be performed.

In the process (B), when it is determined that the operating position of the first valve V1 is aligned through the process (A) (that is, when a condition is satisfied), the controller 100 operates the first water pump 14 or the oil pump 16a at S4.

In step S4 in which the controller 100 operates the first water pump 14 or the oil pump 16a, the controller 100 may control an operation amount of the first water pump 14 or the oil pump 16c according to the temperatures of the electrical component 15 and the motor 16 based on the data detected by the data detector 110.

On the other hand, in step S3 in which the controller 100 determines whether the operating position of the first valve V1 is aligned, when it is determined that the operating position of the first valve V1 is not aligned (that is, when a condition is not satisfied), the controller 100 aligns the operating position of the first valve V1 so that the branch line 18 is closed and the coolant line 11 connected to the radiator 12 is opened at S5.

Then, the controller 100 may perform the operating (S4) of the first water pump 14 or the oil pump 16a.

When it is determined that it is necessary to increase the temperatures of the electrical component 15 and the motor 16 according to the signal outputted from the electrical component temperature sensor 116, the controller 100 may open the branch line 18 through the control of the first valve V1.

Then, the flow rate of coolant cooled through heat-exchange with outside air in the radiator 12 may be reduced. Accordingly, the temperature of the coolant circulating in the cooling apparatus 10 may be increased, and the temperatures of the electrical component 15 and the motor 16 may be quickly increased.

In addition, when step S4 in which the controller 100 operates the first water pump 14 or the oil pump 16a is completed, the controller 100 may operate the air conditioner 50 at S6, and may perform the process (C).

In the process (C), the controller 100 operates the battery chiller expansion valve 74 for expanding the refrigerant supplied to the battery chiller 70 so as to efficiently cool the battery module 32 by using the coolant heat-exchanged with the refrigerant at S7.

Then, the controller 100 adjusts the opening degree of the battery chiller expansion valve 74 at S8.

Here, step S8 of adjusting the opening degree of the battery chiller expansion valve 74 may be performed based on the data detected by the data detector 110 after the controller 100 performs step S7 of operating the battery chiller expansion valve.

That is, the controller 100 may adjust the opening degree of the battery chiller expansion valve 74 according to the signal detected by the battery temperature sensor 114, thereby adjusting the flow rate of the expanded refrigerant flowing into the battery chiller 70.

When step S8 is completed, the controller 100 controls the compressor 59, and ends the control at S9.

Here, in the step in which the controller 100 controls the compressor 59, the controller 100 may increase the revolutions per minute (RPM) of the compressor 59. Then, the entire flow rate of refrigerant circulating in the air conditioner 50 is increased.

Accordingly, the controller 100 efficiently controls the flow rate of the refrigerant supplied to the battery chiller 70 through the operation control of the cooling apparatus 10 and the battery cooling apparatus 30, and the control of the battery chiller expansion valve 74, thereby delaying a sudden increase in the temperature of the battery module 32 during the track driving.

As described above, in the thermal management system control method for the vehicle according to the embodiment of the present disclosure, by delaying the rapid rise of the temperatures of the electrical component 15, the motor 16, and the battery module 32 during track driving of the vehicle while performing respective steps described above, the vehicle's performance may be maximized during the track driving.

When the thermal management system control method for the vehicle according to the embodiment of the present disclosure as described above is applied, it is possible to improve overall cooling performance by preventing the rapid temperature rise of the electrical component 15, the motor 16, and the battery module 32 during the track driving of the high performance electric vehicle.

In addition, according to the present disclosure, it is possible to secure additional cooling performance during the track driving of the vehicle by performing the temperature control of the electrical component 15, the motor 16, and the battery module 32 before the start of the track driving.

In addition, according to the present disclosure, the battery module 32 may operate in an optimum performance state by efficiently controlling the temperature of the battery module 32, and the total traveling distance of the vehicle may be increased through the efficient management of the battery module 32.

Further, according to the present disclosure, it is possible to improve durability and reliability of the electrical component 15, the motor 16, and the battery module 32 through efficient temperature control of the electrical component 15, the motor 16, and the battery module 32, and it is possible to reduce maintenance costs, thereby improving overall marketability of a vehicle.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A thermal management system control method for a vehicle, comprising:
   (A) a process in which a controller determines whether a track driving mode is selected based on data detected from a data detector before track driving of the vehicle, and determines an alignment position of a valve;
   (B) a process in which the controller, through the process (A), determines the alignment position of the valve and controls a water pump or an oil pump, and operates an air conditioner; and
   (C) a process in which, when the air conditioner is operated through the process (B), the controller controls a battery chiller expansion valve and a compressor, and ends the control;
   wherein the process (A) further includes:
      operating, by the controller, the track driving mode according to an operation of a track driving mode operating part by a manipulation or setting of a user before driving of the vehicle; and
      determining, by the controller, whether an operating position of the valve is aligned based on the data detected from the data detector.

2. The thermal management system control method for the vehicle of claim 1, wherein when it is determined that the operating position of the valve is aligned, the process (B) is performed.

3. The thermal management system control method for the vehicle of claim 1, wherein the process (B) further includes:
   operating, by the controller, a water pump or an oil pump; and
   operating, by the controller, the air conditioner.

4. The thermal management system control method for the vehicle of claim 3, wherein in the operating of the water pump or the oil pump, the controller controls an operation amount of the water pump or the oil pump according to a temperature of an electrical component based on the data detected by the data detector.

5. The thermal management system control method for the vehicle of claim 3, wherein when it is determined that the operating position of the valve is not aligned, the controller performs aligning of the operating position of the valve.

6. The thermal management system control method for the vehicle of claim 5, wherein after the controller aligns the operating position of the valve, the controller operates a water pump or an oil pump.

7. The thermal management system control method for the vehicle of claim 1, wherein the process (A) further includes increasing a de-rating temperature of a battery module.

8. The thermal management system control method for the vehicle of claim 7, wherein the increasing of the de-rating temperature of the battery module is performed after the operating of the track driving mode.

9. The thermal management system control method for the vehicle of claim 1, wherein the process (C) further includes:
   operating, by the controller, a battery chiller expansion valve; and
   controlling, by the controller, the compressor, and terminating the control.

10. The thermal management system control method for the vehicle of claim 9, wherein the process (C) includes adjusting, by the controller, an opening degree of the battery chiller expansion valve.

11. The thermal management system control method for the vehicle of claim 10, wherein the adjusting of the opening degree of the battery chiller expansion valve is performed based on data detected from the data detector after the operating of the battery chiller expansion valve.

12. The thermal management system control method for the vehicle of claim 10, wherein in the controlling of the compressor, the controller increases revolutions per minute (RPM) of the compressor.

13. The thermal management system control method for the vehicle of claim 1, wherein the data detector includes:
   a track driving mode operating part that operates according to a manipulation of a user;
   a battery temperature sensor that measures a temperature of a battery module;
   an electrical component temperature sensor that measures a temperature of an electrical component; and
   a valve detector that detects an alignment position of the valve.

* * * * *